(12) United States Patent
Kuiper

(10) Patent No.: US 8,309,207 B2
(45) Date of Patent: Nov. 13, 2012

(54) ADHESIVE ARTICLES WITH IMPROVED AIR EGRESS

(75) Inventor: Klaas Kuiper, Alphen aan den Rijn (NL)

(73) Assignee: Avery Dennison Corporation, Pasadena, CA (US)

(*) Notice: Subject to any disclaimer, the term of this patent is extended or adjusted under 35 U.S.C. 154(b) by 567 days.

(21) Appl. No.: 12/365,967

(22) Filed: Feb. 5, 2009

(65) Prior Publication Data

US 2010/0196664 A1 Aug. 5, 2010

(51) Int. Cl.
*B32B 9/00* (2006.01)
*B32B 33/00* (2006.01)

(52) U.S. Cl. ..... 428/156; 428/40.1; 428/41.8; 428/42.1; 428/202

(58) Field of Classification Search .................. 428/40.1, 428/41.8, 42.1, 141, 201, 202, 67
See application file for complete search history.

(56) References Cited

U.S. PATENT DOCUMENTS

| | | |
|---|---|---|
| 4,636,408 A | 1/1987 | Anthony et al. |
| 5,061,535 A | 10/1991 | Kreckel et al. |
| 5,112,890 A | 5/1992 | Behrens et al. |
| 5,141,790 A | 8/1992 | Calhoun et al. |
| 5,162,390 A | 11/1992 | Tilley et al. |
| 5,192,612 A | 3/1993 | Otter et al. |
| 5,296,277 A | 3/1994 | Wilson et al. |
| 5,346,766 A | 9/1994 | Otter et al. |
| 5,362,516 A | 11/1994 | Wilson et al. |
| 5,369,140 A | 11/1994 | Valet et al. |
| 5,559,163 A | 9/1996 | Dawson et al. |
| 5,560,796 A | 10/1996 | Yoshimura |
| 5,589,246 A | 12/1996 | Calhoun et al. |
| 5,591,290 A | 1/1997 | Walter et al. |
| 5,650,215 A | 7/1997 | Mazurek et al. |
| 5,676,787 A | 10/1997 | Rusincovitch et al. |
| 5,897,930 A | 4/1999 | Calhoun et al. |
| 6,083,616 A | 7/2000 | Dressler |

(Continued)

FOREIGN PATENT DOCUMENTS

EP 0 452 368 10/1991

(Continued)

OTHER PUBLICATIONS

International search report and written opinion issued in corresponding International application PCT/US023269 dated May 28, 2010.

*Primary Examiner* — Catherine A Simone
(74) *Attorney, Agent, or Firm* — Avery Dennison Corporation

(57) ABSTRACT

The disclosed technology provides an adhesive article with repositionability and air egress characteristics. The adhesive article comprises an adhesive layer having a surface comprising a plurality of spaced apart non-adhesive forms. The non-adhesive forms are arranged in a pattern comprising one or more lanes defined by adjacent rows of non-adhesive forms and a pattern of non-adhesive forms disposed in an area adjacent the lanes. The spacing between the non-adhesive forms in the area adjacent the lanes is larger than the spacing between the non-adhesive forms defining the lanes. The non-adhesive forms disposed within the area adjacent the lanes prevents sticking of the article prior to applying pressure. Upon application of pressure, air entrapped within the areas adjacent the lanes flows to the lanes, and the lanes provide the article with air egress.

15 Claims, 5 Drawing Sheets

U.S. PATENT DOCUMENTS

| | | | |
|---|---|---|---|
| 6,123,890 | A | 9/2000 | Mazurek et al. |
| 6,197,397 | B1 | 3/2001 | Sher et al. |
| 6,315,851 | B1 | 11/2001 | Mazurek et al. |
| 6,440,880 | B2 | 8/2002 | Mazurek et al. |
| 6,495,229 | B1 | 12/2002 | Carte et al. |
| 6,524,649 | B1 | 2/2003 | Sher et al. |
| 6,524,675 | B1 | 2/2003 | Mikami et al. |
| 6,565,697 | B1 | 5/2003 | Maercklein |
| 6,616,993 | B2 | 9/2003 | Usuki et al. |
| 6,623,824 | B1 | 9/2003 | Joseph et al. |
| 6,759,110 | B1 | 7/2004 | Fleming et al. |
| 6,803,072 | B2 | 10/2004 | Sher et al. |
| 6,838,142 | B2 | 1/2005 | Yang et al. |
| 6,838,150 | B2 | 1/2005 | Mazurek et al. |
| 2003/0077423 | A1 | 4/2003 | Flanigan et al. |
| 2003/0124293 | A1 | 7/2003 | Sher et al. |
| 2003/0129343 | A1 | 7/2003 | Galkiewicz et al. |
| 2003/0178124 | A1 | 9/2003 | Mikami et al. |
| 2003/0207065 | A1 | 11/2003 | Sher et al. |
| 2003/0236318 | A1 | 12/2003 | Kitano et al. |
| 2004/0216833 | A1 | 11/2004 | Fleming et al. |
| 2005/0208252 | A1 | 9/2005 | Hannington et al. |
| 2006/0127626 | A1 | 6/2006 | Fleming et al. |
| 2007/0154670 | A1 | 7/2007 | Hannington |

FOREIGN PATENT DOCUMENTS

| | | |
|---|---|---|
| EP | 0 951 518 | 10/1999 |
| EP | 1471126 A2 | 10/2004 |
| GB | 1 511 060 | 5/1978 |
| JP | 59-078285 | 5/1984 |
| WO | 00/69985 | 11/2000 |
| WO | 01/81080 | 11/2001 |
| WO | WO 0181080 A1 * | 11/2001 |
| WO | 03/099953 | 12/2003 |
| WO | 2006/065656 | 6/2006 |

* cited by examiner

ADHESIVE ARTICLES WITH IMPROVED AIR EGRESS

TECHNICAL FIELD OF THE INVENTION

The disclosed technology relates to adhesive articles and methods of making the same. The adhesive articles may be used in a variety of applications including, for example, for signage, displays and articles containing graphic images.

BACKGROUND OF THE INVENTION

Pressure sensitive adhesives have enjoyed great acceptance for their convenience of use. The pressure sensitive adhesive is often used for films and articles containing graphic images. The advantages of the pressure sensitive adhesives are their strong bonding and simplicity of application. Pressure sensitive adhesives typically have a relatively high strength and high initial bonding tenacity. The positioning of the product must be precise because of the adhesive's initial strong bond. To reposition the adhesive, the portion of the article adhered to the substrate must be pulled from the substrate, which may result in the adhesive article being deformed, torn, wrinkled, creased, or the like. Attempts have been made to make adhesive articles repositionable and/or slideable. A product may be considered repositionable where the product may be removed after light application of pressure without destroying the product or the substrate. Slideability allows for correction of alignment of the adhesive article without the need of completely removing the article and possibly destroying the adhesive article or the substrate. For example, stand-offs and areas of non-adhesive material have been used to reduce the initial tenacity of an adhesive surface.

Adhesive articles may also be prone to trapping air under the product and forming bubbles or wrinkles when the article is applied to a substrate. Air egress may be referred to as the ability of the product to provide a route for air trapped under the product to be removed.

Generally, two separate systems are required to provide an adhesive article with both air egress and repositioning characteristics. That is, to exhibit both characteristics, an adhesive article must include a first system to provide repositionability and a second system to provide air egress. For example, areas of non-adhesive material may be used to provide repositionability and/or slideability. Air egress is typically provided by a groove or recessed area embossed in the surface of the adhesive layer.

SUMMARY OF THE INVENTION

The disclosed technology provides an adhesive article comprising a pattern of discrete, non-adhesive forms disposed on an adhesive surface. Applicant has found that a single system in the form of a pattern of non-adhesive forms may be utilized in an adhesive article to provide both air egress and repositionability characteristics. By using an arrangement in accordance with aspects of the invention, repositionability and air egress characteristics may be obtained using the non-adhesive forms alone without the further need to provide a pattern of grooves embossed in the adhesive surface.

The present invention also provides a release liner suitable for use in forming an adhesive article in accordance with the invention. The present invention also provides methods of making the release liner and the adhesive article.

In one aspect, the present invention provides an adhesive article comprising a facestock having a front surface and a back surface, and an adhesive layer having an upper surface and a lower surface, the upper surface of the adhesive layer being disposed on the back surface of the facestock, the adhesive layer comprising a plurality of non-adhesive forms extending from the lower surface of the adhesive layer. The non-adhesive forms are arranged in a pattern comprising at least one lane defined by a pattern of closely spaced non-adhesive forms, and a plurality of non-adhesive forms disposed in an area adjacent to the lanes, the non-adhesive forms disposed in the area adjacent the lanes having a greater spacing than non-adhesive forms in the pattern defining the lanes.

In another aspect, the present invention provides a release liner comprising a moldable layer; a release layer overlying the moldable layer, the release layer having a top surface; and a pattern of discrete, non-adhesive forms at least partially embedded into the release layer, the pattern of non-adhesive forms comprising: a lane comprising a first row of discrete non-adhesive forms and a second row of discrete non-adhesive forms adjacent the first row of non-adhesive forms, the first and second rows being spaced apart from each other by a spacing $S_1$ and individually having a maximum form-to-form spacing $S_3$ between adjacent non-adhesive forms within a given row; and a pattern of non-adhesive forms disposed in an area adjacent the lane and comprising at least two non-adhesive forms having a second form-to-form spacing $S_2$, wherein $S_2$ is greater than $S_1$ and/or $S_3$.

In still another aspect, the present invention provides an adhesive article comprising a release liner comprising a release surface and a back surface; a plurality of non-adhesive forms embedded into the release surface of the release liner, the non-adhesive forms having a top surface; and an adhesive layer having an upper surface and a lower surface overlying the release surface of the release liner and the non-adhesive forms; the non-adhesive forms being arranged in a pattern comprising at least one lane defined by adjacent rows of closely spaced non-adhesive forms; and a pattern of non-adhesive forms disposed in an area adjacent to the rows defining the at least one lane, wherein adjacent non-adhesive forms in the pattern disposed in the areas adjacent the rows have a form-to-form spacing greater than the form-to-form spacing between the non-adhesive forms in the lanes.

In yet another aspect, the present invention provides an adhesive article comprising a release liner comprising a release surface and a back surface; a plurality of non-adhesive forms embedded into the release surface of the release liner, the non-adhesive forms having a top surface; and an adhesive layer having an upper surface and a lower surface, the lower surface overlying the release surface of the release liner and the non-adhesive forms; wherein the non-adhesive forms are arranged in a pattern comprising a lane comprising a first row of discrete non-adhesive forms and a second row of discrete non-adhesive forms adjacent the first row of non-adhesive forms, the first and second rows being spaced apart from each other by a spacing $S_1$ and individually having a maximum form-to-form spacing $S_3$ between adjacent non-adhesive forms within a given row; and a pattern of non-adhesive forms disposed in an area adjacent the lane and comprising at least two non-adhesive forms having a second form-to-form spacing $S_2$, wherein $S_2$ is greater than $S_1$.

In another aspect, the present invention provides an adhesive article comprising a facestock having a front surface and a back surface; an adhesive layer having an upper surface and a lower surface, the upper surface of the adhesive disposed over the back surface of the facestock; and a plurality of non-adhesive forms disposed on the lower surface of the adhesive layer, wherein the non-adhesive forms are arranged in a pattern comprising a lane comprising a first row of discrete non-adhesive forms and a second row of discrete non-adhesive forms adjacent the first row of non-adhesive forms, the first and second rows being spaced apart from each other by a spacing $S_1$ and individually having a maximum form-to-form spacing $S_3$ between adjacent non-adhesive forms within a given row; and a pattern of non-adhesive forms disposed in an area adjacent the lane and comprising at least two non-adhesive forms having a second form-to-form spacing $S_2$, wherein $S_2$ is greater than $S_1$.

In a further aspect, the present invention provides a method of making an adhesive article comprising applying a pattern of non-adhesive material onto a release layer of a release liner, the pattern of non-adhesive material comprising a lane comprising a first row of discrete non-adhesive forms and a second row of discrete non-adhesive forms adjacent the first row of non-adhesive forms, the first and second rows being spaced apart from each other by a spacing $S_1$ and individually having a maximum form-to-form spacing $S_3$ between adjacent non-adhesive forms within a given row; and a pattern of non-adhesive forms disposed in an area adjacent the lane and comprising at least two non-adhesive forms having a second form-to-form spacing $S_2$, wherein $S_2$ is greater than $S_1$; embedding the non-adhesive material into the release liner; coating a pressure sensitive adhesive onto the release layer of the release liner; and applying a facestock or second release liner to the adhesive layer.

In another aspect, the present invention provides an adhesive article comprising a release liner comprising a release surface and a back surface; a plurality of non-adhesive forms embedded into the release surface of the release liner, the non-adhesive forms having a top surface; and an adhesive layer having an upper surface and a lower surface overlying the release surface of the release liner and the non-adhesive forms; the non-adhesive forms being arranged in a pattern comprising a first row comprising a plurality of non-adhesive forms, adjacent forms in the first row having a first form-to-form spacing; a second row comprising a plurality of non-adhesive forms, adjacent forms in the second row having a second form-to-form spacing, the second row of non-adhesive forms being disposed substantially parallel to the first row of non-adhesive forms, the first and second rows being spaced apart from one another so as to define a lane, where a non-adhesive form of the first row and an adjacent non-adhesive form in the second row has a third form-to-form spacing, and a pattern of non-adhesive forms disposed in an area adjacent at least one of the first and second rows, the non-adhesive forms disposed in the area adjacent the first and/or second row having a fourth form-to-form spacing that is greater than at least one of the first form-to-form spacing, the second form-to-form spacing, and/or the first form-to-form spacing.

In yet another aspect, the present invention provides a method of making an adhesive article comprising embossing a pattern of depressions into a release layer of a release liner, the pattern of depressions comprising: a lane comprising a first row of discrete non-adhesive forms and a second row of discrete non-adhesive forms adjacent the first row of non-adhesive forms, the first and second rows being spaced apart from each other by a spacing $S_1$ and individually having a maximum form-to-form spacing $S_3$ between adjacent non-adhesive forms within a given row; and a pattern of non-adhesive forms disposed in an area adjacent the lane and comprising at least two non-adhesive forms having a second form-to-form spacing $S_2$, wherein $S_2$ is greater than $S_1$ and/or $S_3$; depositing non-adhesive material into the depressions; coating a pressure-sensitive adhesive onto the release layer of the release liner; and applying a facestock or a second release liner over the pressure sensitive adhesive.

These and other aspects of the invention will be further understood with reference to the figures, the detailed description, and the appended claims.

BRIEF DESCRIPTION OF THE DRAWINGS

The drawings are for the purpose of illustrating various aspects of the invention and are not intended to limit the invention described in the appended claims. The drawings are schematic illustrations of exemplary embodiments and are not drawn to scale.

DETAILED DESCRIPTION OF THE INVENTION

Figure 1:
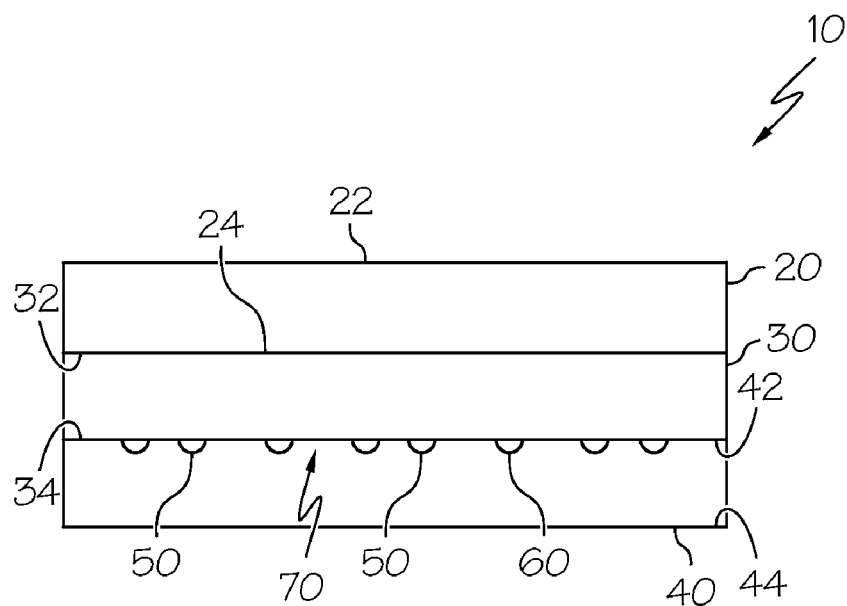
FIG. 1 is a cross-sectional view of an adhesive article with a release liner and non-adhesive material.

The disclosed technology provides an adhesive article having improved air egress and repositionability characteristics. The adhesive article may comprise a facestock, a continuous adhesive layer, and a non-adhesive material disposed on a surface of the adhesive layer. The adhesive article may further comprise a release liner releasably adhered to the adhesive layer. The non-adhesive material forms are disposed on the adhesive layer in a pattern comprising one or more lanes defined by closely spaced rows of non-adhesive forms and a pattern of non-adhesive forms disposed in an area adjacent to the rows. The spacing between the non-adhesive forms in the pattern disposed in the area adjacent the rows is greater than the spacing between the non-adhesive forms in the rows and/or the spacing between the lanes.

In the drawings, like reference numerals indicate like elements. In some circumstances, like reference numerals may be further designated with a letter to represent different instances of substantially similar elements and/or for convenience to aid in discussing various aspects of the disclosed technology.

Figure 2:
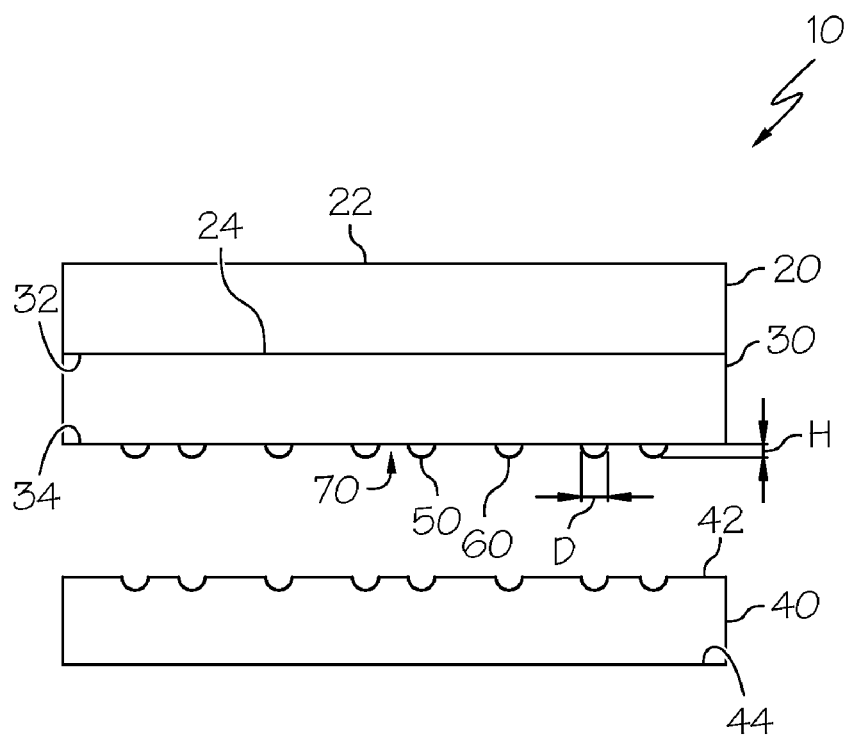
FIG. 2 is a cross-sectional view of the adhesive article of FIG. 1 with the release liner removed.

Referring to FIGS. 1-2, an adhesive article 10 is shown comprising a facestock 20 having a front surface 22 and a back surface 24, an adhesive layer 30 having an upper surface 32 and a lower surface 34, and a release liner 40 having an upper surface 42 and a lower surface 44, the upper surface 42 being in releasable contact with the lower surface 34 of the adhesive layer. The upper surface 32 of the adhesive layer 30 is disposed about the back surface 24 of the facestock 20. The adhesive article includes a pattern or arrangement of non-adhesive forms, the pattern comprising non-adhesive forms material 50 and 60. As shown in FIG. 1, the non-adhesive material 50 and 60 is embedded in the release liner 40. When the release liner 40 is removed from the adhesive article, as illustrated in FIG. 2, the non-adhesive forms 50 and 60 preferentially adhere to the adhesive layer.

Figure 3:
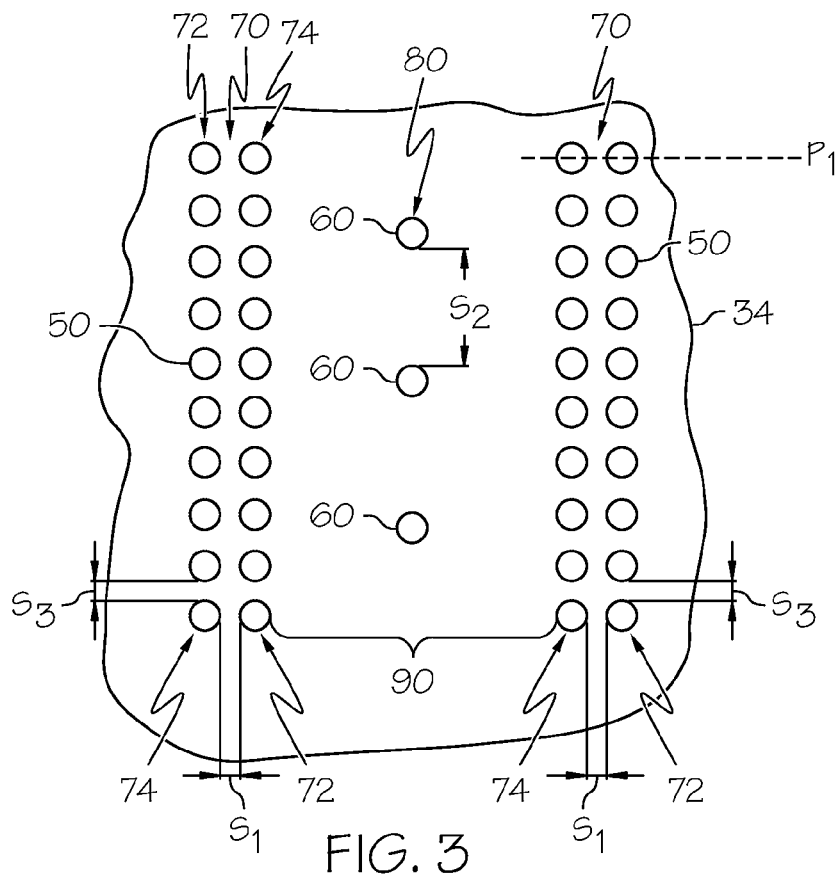
FIG. 3 is a top view of a section of the adhesive article of FIG. 1 with the release liner removed and looking at a section of the lower surface of the adhesive having a pattern of non-adhesive material on the lower surface of the adhesive layer.

FIGS. 1-3 illustrate an arrangement of the non-adhesive forms 50 and 60 in accordance with one embodiment of the present invention. The non-adhesive forms are arranged on the surface 34 of adhesive layer 30 in a pattern comprising (i) lanes 70 formed by closely spaced rows 72 and 74, and (ii) a pattern 80 of non-adhesive forms 60 disposed in an area 90 adjacent the lanes 70. The lanes 70 are formed from rows 72 and 74, which each comprise a plurality non-adhesive forms 50. The non-adhesive forms defining the rows 72 and 74 and, subsequently, the lanes 70 may be closely spaced with respect to an inter-row spacing ($S_1$) and/or an intra-row spacing ($S_3$) of adjacent non-adhesive forms. The spacing between adjacent non-adhesive forms may also be referred to as form-to-form spacing, and represents the spacing from the edge of one non-adhesive form to the edge of the nearest, adjacent non-adhesive form. The edge-to-edge spacing between adjacent forms may also be referred to as the clearance between adjacent forms. The non-adhesive forms 60 disposed in the area 90 adjacent or external to the lanes 70 have a form-to-form spacing ($S_2$) that is greater than the form-to-form spacing of the non-adhesive forms in the lanes 70 and/or in the rows 72 and 74. The spacing $S_2$ is greater than at least one of $S_1$ and $S_3$. In one embodiment, the spacing $S_2$ of the non-adhesive forms 60 adjacent the forms defining the lanes 70 is greater than both the spacing $S_1$ and the spacing $S_3$.

Figure 4:
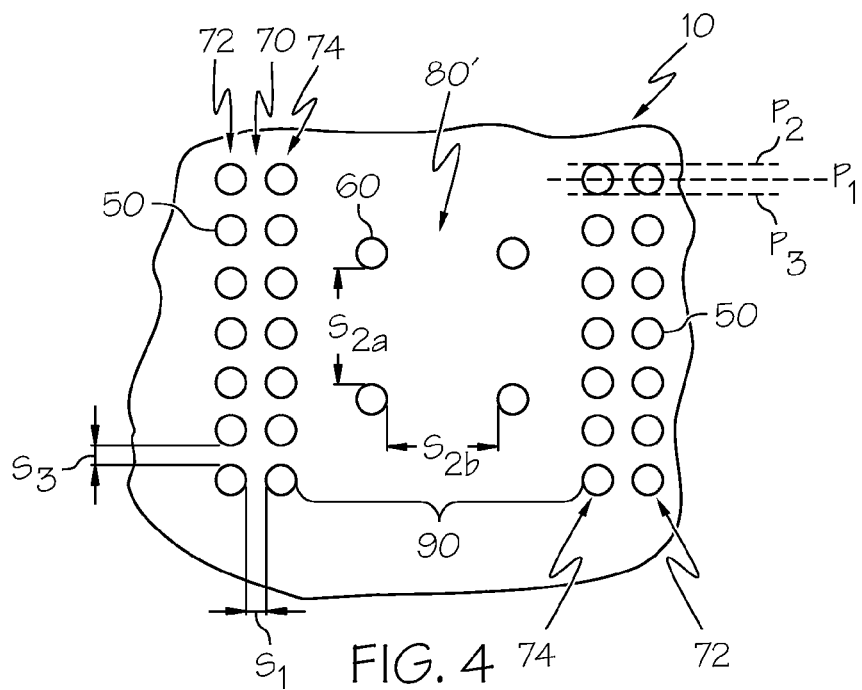
FIG. 4 is a top view of a section of an adhesive article with an exposed lower adhesive surface illustrating another exemplary arrangement of non-adhesive material on the adhesive surface.
Figure 5:
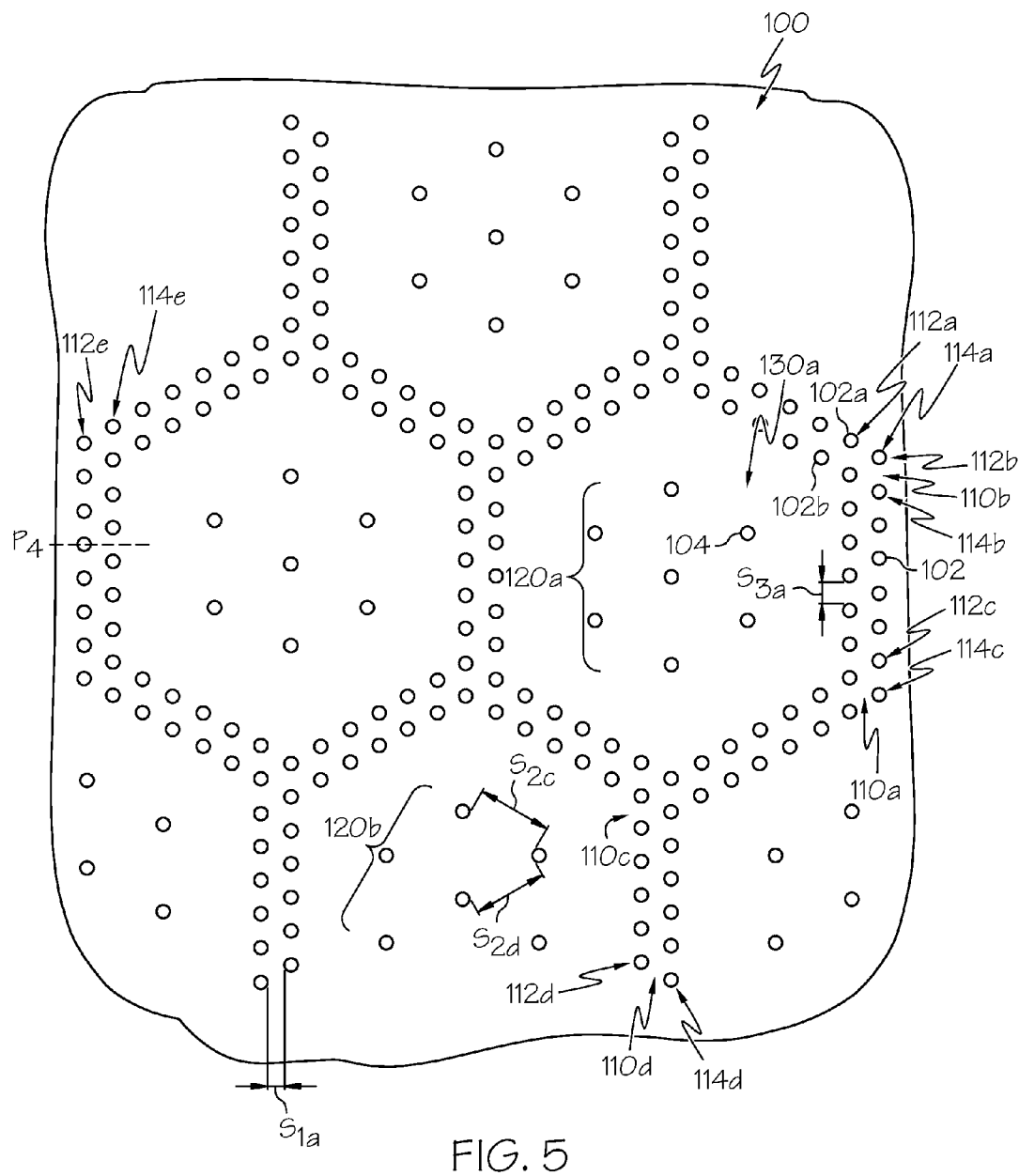
FIG. 5 is a top view of a section of an adhesive article with an exposed lower adhesive surface illustrating another exemplary arrangement of non-adhesive material on the adhesive surface.

The rows 72 and 74 of non-adhesive material 50 that define the lanes 70 may be disposed substantially parallel to one another. The parallel rows may be arranged such that the centers (and/or the edges) of a non-adhesive form of one row lies substantially in the same horizontal plane as the center (and/or edges) of an adjacent non-adhesive form in the adjacent row, such as is illustrated in FIGS. 3 and 4 where the center of a form in row 72 lies in the same plane $P_1$ as the center of a form in row 74. In this embodiment, the edges of a non-adhesive form in row 72 lie in substantially the same planes ($P_2$ and $P_3$) of an adjacent non-adhesive form in row 74. Alternatively, parallel rows may be arranged such that the centers (and/or edges) of adjacent non-adhesive forms of adjacent rows are offset with respect to each other, as is illustrated in FIG. 5. As shown in FIG. 5, for example, the center of a non-adhesive form in row 114e is displaced relative to the plane $P_4$, which passes through the center of the nearest non-adhesive form(s) in the adjacent row 112e.

The rows and lanes may be provided in any desired configuration as selected for a particular purpose. In one embodiment, the lanes may be configured as substantially straight lanes (defined by substantially straight rows) extending between ends of the adhesive surface. In another embodiment, the lanes may be provided as a curve, stepped pattern, zigzag, or other line or geometric configuration. The lanes may be arranged substantially parallel to each other (as illustrated in FIGS. 3 and 4) perpendicular or may be arranged at angles relative to each other.

In another embodiment, the lanes may be interconnected to define an array of geometric shapes. With reference to FIG. 5, a pattern of non-adhesive forms comprising a series of interconnected lanes defining an array of geometric shapes is shown. In FIG. 5, a pattern 100 is formed from a plurality of non-adhesive forms 102 and 104. The pattern includes a plurality of lanes 110 defined by rows 112 and 114, which are formed from non-adhesive forms 102. The arrangement is shown as having an inter-row spacing $S_{1a}$ and an intra-row spacing $S_{3a}$. In FIG. 5, the lanes 110 and rows 112, 114 are designated with a further letter reference (e.g., 110a, 112a, 114a, 110b, 112b, 114b, and so forth) to identify different lanes and rows. As shown in FIG. 5, the lanes 110 are interconnected to define an array of hexagons. For example, lane 110a is interconnected with lanes 110b and 110c, and lane 110c is interconnected with at least lane 110d, and so forth.

In a pattern comprising a series of interconnected lanes, a non-adhesive form does not have to exclusively reside in one row and may be considered as a member of more than one row. That is, rows may share non-adhesive forms with other rows. For example, as shown in FIG. 5, non-adhesive form 102a may be considered as part of row 112a and 112b, and non-adhesive form 102b may be considered as part of 112a and 114b.

A pattern of interconnected lanes may define any geometric shape as desired for a particular purpose or intended use. Suitable geometric shapes include, but are not limited to, triangles, rectangles (including squares), diamonds, trapezoids, pentagons, hexagons, heptagons, octagons, and the like. Interconnected lanes may also be employed to define curved geometries such as, for example, circles, bells, balloons, arches, and the like.

Figure 6:
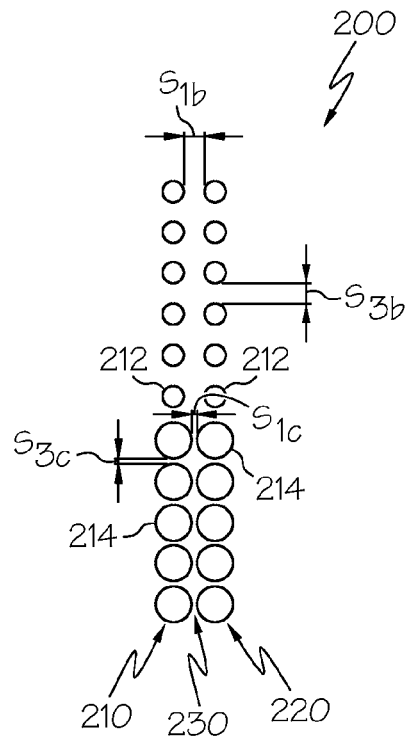
FIG. 6 is a top view of an exemplary arrangement of non-adhesive materials defining a lane.
Figure 7:
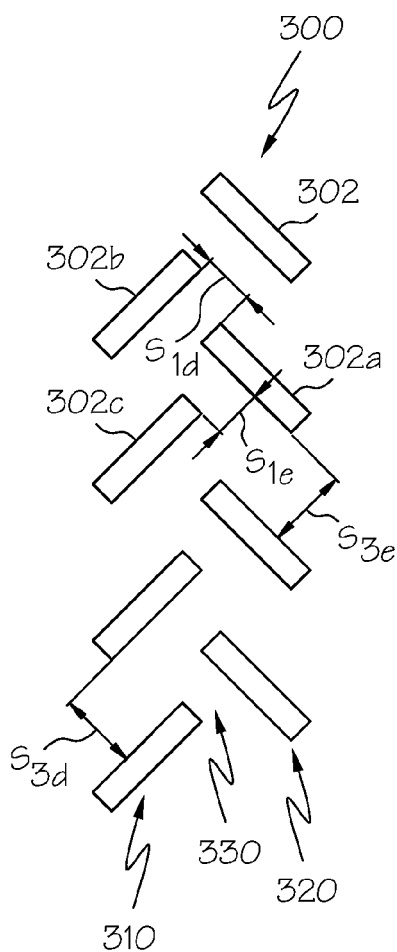
FIG. 7 is a top view of another exemplary arrangement of non-adhesive material defining a lane.

It will be appreciated that the closely spaced rows may be configured in any arrangement as desired for a particular purpose or intended use. While the rows of FIGS. 2-5 employ non-adhesive forms of the same size and shape, a row or rows may employ non-adhesive forms of different sizes and/or shapes based on the size and/or shape of the non-adhesive forms employed. FIG. 6, for example, illustrates an arrangement 200 in which the respective rows 210 and 220 each employ non-adhesive forms (212 and 214) of different sizes. FIG. 7 illustrates an arrangement 300 in which the rows are formed from non-adhesive forms 302 having a rectangular top-view shape. In FIG. 7, the non-adhesive forms 302 are angled relative to one another within the respective rows 310 and 320.

Upon forming the non-adhesive forms, as is more fully described below, forms within a row may occasionally contact each other such that adjacent forms may be connected. Desirably, the number of connected forms in a row parallel to the direction of the lane is as minimal as possible. In one embodiment, the number of connected non-adhesive forms in a given row is less than about 5, less than about 3, or less than about 2.

As discussed above, the non-adhesive forms utilized to form the rows that define the lanes are closely spaced with respect to their form-to-form spacing. The form-to-form spacing may be based on the distance from the edge of one non-adhesive form to the edge of the nearest adjacent non-adhesive form. The spacing of the non-adhesive forms may be defined with respect to (i) the inter-row spacing, which may be defined as the form-to-form spacing ($S_1$) between a non-adhesive form of one row and an adjacent non-adhesive form in the adjacent row, and/or (ii) the intra-row spacing, which may be defined by the form-to-form spacing ($S_3$) between adjacent non-adhesive forms within a given row. In one embodiment, the inter-row spacing $S_1$ may be from about 1 to about 150 μm. In another embodiment, the inter-row spacing $S_1$ may be from about 50 to about 120 μm. In still another embodiment, the inter-row spacing $S_1$ may be from about 80 to about 100 μm. In one embodiment, the intra-row spacing $S_3$ may be from about 1 to about 100 μm. In another embodiment, the intra-row spacing $S_3$ may be from about 50 to about 120 μm. In still another embodiment, the intra-row spacing $S_3$ may be from about 80 to about 100 μm. In one embodiment, the form-to-form spacing $S_1$ and/or $S_3$ may be related to the height (H) of the non-adhesive forms. In one embodiment, the minimum spacing of $S_1$ and/or $S_3$ is at least about one tenth of the height of the non-adhesive forms (0.1×H). In one embodiment, the maximum spacing of $S_1$ and/or $S_3$ is about five times the height of the non-adhesive forms (5×H) or less. Again, $S_1$ and $S_3$ may be the same or different.

The inter-row and/or intra-row spacing of the non-adhesive materials defining the lanes may be the same or different. In the FIGS. 3-5, for example, the form-to-form spacing within a row is illustrated as being uniform throughout the row. It will be appreciated, however, that the spacing of the non-adhesive forms within a row and/or the spacing between adjacent rows does not have to be uniform and can be varied as desired throughout the row. For example, referring to FIG. 6, a pattern 200 of non-adhesive forms defining a lane 230 is shown comprising rows 210 and 220. Rows 210 and 220 each comprise non-adhesive forms 212 and 214. The non-adhesive forms 212 have a smaller diameter than the non-adhesive forms 214. The spacing $S_{3b}$ between the non-adhesive forms 212 is larger than the spacing $S_{3c}$ between adjacent non-adhesive forms 214 within a given row. The rows 210 and 220 define a lane 230. As shown in FIG. 6, the size of the lane 230 is different in the region between the non-adhesive forms 212 which have an inter-row spacing $S_{1b}$, as compared to the region between the non-adhesive forms 214 which have an inter-row spacing $S_{1c}$.

In FIG. 7, the non-adhesive forms 320 are angled within a given row, and the rows 310 and 320 are staggered relative to each other. The forms in row 310 have an intra-row spacing $S_{3d}$ and the forms in row 320 have a spacing $S_{3e}$, which may be the same or different than the spacing $S_{3d}$. The rows 310 and 320 are arranged such that they are overlapped. For example, a portion of a non-adhesive form in row 310 extends into an area defined by row 320. Since the rows are staggered, the non-adhesive forms of row 310 do not contact the non-adhesive forms of row 320, and a lane 330 is defined based on the spacing between a form in one row and an adjacent form in the other row. In this embodiment, a non-adhesive form of one row has two adjacent non-adhesive forms from the adjacent row. For example, non-adhesive form 302a is adjacent non-adhesive forms 302b and 302c. There is an inter-row spacing of $S_{1d}$ between form 302a and 302b and an inter-row spacing of $S_{1e}$ between form 302a and 302c. It will be appreciated that $S_{1d}$ and $S_{1e}$ may be the same or different.

FIGS. 6 and 7 illustrate an arrangement of rows defining lanes. It will be appreciated that a pattern comprising such an arrangement would also comprise a pattern of non-adhesive forms disposed in an area adjacent the rows/lanes.

The pattern of non-adhesive forms disposed in the area adjacent the lanes (e.g., form 60 in FIGS. 1-3) is provided by a plurality of non-adhesive forms having a form-to-form spacing $S_2$ between adjacent forms that is greater than the spacing $S_1$ and/or $S_3$ of the non-adhesive forms defining the lanes. The spacing $S_2$ is defined by the spacing between the edges of adjacent forms in the pattern of non-adhesive forms disposed in the area adjacent the lanes. The non-adhesive forms in the pattern of non-adhesive forms disposed in the area adjacent the lanes may have a form-to-form spacing ($S_2$) of about 10 to about 500 μm. In one embodiment, the spacing $S_2$ is from about 50 to about 400 μm. In another embodiment, the form-to-form spacing $S_2$ of the non-adhesive forms in the area adjacent the lanes may be from about 100 to about 300 μm. In one embodiment, the form-to-form spacing of the non-adhesive forms in the area outside the lanes may be based on the height (H) of the non-adhesive forms. In one embodiment, the minimum form-to-form spacing ($S_2$) of the non-adhesive forms in the area adjacent the lanes is at least about five times the height of the non-adhesive forms (at least about 5×H). In one embodiment, the maximum value for $S_2$ is about fifty times (or less) the height of the non-adhesive forms (20×H or less).

It will be appreciated that in the pattern of non-adhesive forms disposed in the area adjacent the lanes, a given non-adhesive form may have a plurality of adjacent non-adhesive forms. Generally, the smallest form-to-form spacing $S_2$ in the pattern of non-adhesive forms disposed in the area adjacent the lanes will be greater than the largest form-to-form spacing $S_1$ and/or $S_3$) of the non-adhesive forms defining the lanes.

The non-adhesive forms in the pattern disposed in the area(s) adjacent the lanes may be provided in any pattern as desired. Suitable patterns include, for example, a straight line, a curved line, a wavy line, a zigzagging line, a geometric shape, random configuration and the like. In FIG. 3, for example, the pattern 80 of non-adhesive forms 60 disposed in the area 90 adjacent lanes 70 is provided as a straight line. In FIG. 4, the pattern 80' of non-adhesive forms 60 disposed in the area 90 adjacent lanes 70 are provided in parallel rows and, generally, define a square. In the embodiment of FIG. 4, the non-adhesive forms in the pattern 80' have an inter-row $S_{2b}$ and intra-row spacing $S_{2a}$, which may be the same or different. As described above, the smallest value of $S_{2a}$ and $S_{2b}$ will be greater than the largest value of $S_1$ and/or $S_3$.

FIG. 5 illustrates an embodiment in which the non-adhesive forms 104 disposed in the area 120 outside the lanes 110 are arranged in a pattern 130 having the appearance of a hexagon. The non-adhesive forms in this pattern have a form-to-form spacing $S_{2c}$ and $S_{2d}$, which may be the same or different. In the pattern 120 of non-adhesive forms 104, the smallest form-to-form spacing of $S_{2c}$ and $S_{2d}$ should have form-to-form spacing that is greater than the smallest form-to-form spacing of $S_{1a}$ and/or $S_{3a}$ for the non-adhesive forms 102 defining the lanes 112 and 114.

Additionally, the overall pattern may be provided such that the smallest form-to-form spacing between non-adhesive forms in the rows and the lanes and the nearest non-adhesive forms in the pattern disposed in the area adjacent the lanes have a spacing that is greater than the inter-row or intra-row spacing (e.g., $S_1$ and $S_3$, respectively) of the forms defining the lanes. The non-adhesive forms defining the lanes and the non-adhesive forms in the set disposed in the area adjacent the lanes may have a spacing of, for example, about 10 μm to about 500 μm.

The non-adhesive forms may generally be formed from any material that upon drying, cooling, and/or curing is generally not tacky. The non-adhesive material may be made of, for example, an organic polymeric material including, but not limited to, polyurethane, polyvinyl chloride, acrylic polymers, acetate, polyethylene, polypropylene, polystyrene, combinations of two or more thereof, and the like. In one embodiment, the non-adhesive material is an ink, such as a printing ink. The non-adhesive material may also include oils, pigment dispersions, agglomerations of particles, encapsulated materials or any other material that can be distributed using the methods contemplated in this invention.

In one embodiment, the non-adhesive forms may all be formed from the same non-adhesive material. In another embodiment, two or more sets of non-adhesive forms may be formed from different non-adhesive material compositions. For example, a first set of non-adhesive forms may be applied to the release liner using a first non-adhesive material, and a second set of non-adhesive forms may be applied to the release liner using a second non-adhesive material. In one embodiment, for example, the non-adhesive forms employed in the rows forming the lanes may be formed from a first non-adhesive material, and the non-adhesive forms employed in the pattern disposed in the area adjacent the lanes may be formed from a second non-adhesive material. In another embodiment, individual rows (e.g., rows 72 and 74) defining a lane may be formed from different non-adhesive materials. In still another embodiment, a first pattern of non-adhesive forms disposed in a first area adjacent a lane may be formed from a first non-adhesive material, and a second pattern of non-adhesive forms disposed in a second area adjacent a lane may be formed from a second non-adhesive material, and so forth. Of course, if desired, other variations of non-adhesive forms formed from different non-adhesive materials may be employed.

In one embodiment, the non-adhesive material is a UV-curable ink. Ultraviolet radiation curable inks that are useful as the non-adhesive material may generally comprise a binder that includes one or more photopolymerizable monomers. The photopolymerizable monomers generally are ethylenically unsaturated compounds. The unsaturated compounds may contain one or more olefinic double bonds, and they may be low molecular weight compounds (monomeric), or high molecular weight compounds (oligomeric). Illustrative examples of monomers containing one double bond include acrylates such as, for example, alkyl(meth)acrylates or hydroxyalkyl(meth)acrylates such as methyl-, ethyl-, butyl-, 2-ethylhexyl- or 2-hydroxyethylacrylate, isobornylacrylate, methyl- or ethylmethacrylate, and the like. Further examples of photopolymerizable monomers include acrylonitrile, acrylamide, methacrylamide, N-substituted(meth)acrylamides, vinyl esters such as vinyl acetate, vinyl ethers such as isobutylvinyl ether, styrene, alkylstyrenes and halostyrenes, N-vinylpyrrolidone, vinyl chloride, vinylidene chloride, and the like.

Suitable monomers containing a plurality of double bonds include, but are not limited to, the diacrylates of ethylene glycol, 1,3-propylene glycol, 1,4-butaneodiol, 1,4-cyclohexane diol, neopentyl glycol, hexamethylene glycol, or bisphenol A polyacrylates such as trimethylolpropane triacrylate and pentaerythritol triacrylate or tetraacrylate, vinyl acrylate, divinyl benzene, divinyl succinate, diallyl phthalate, triallylphosphate, triallylisocyanurate, tris(2-acryloyloxy)ethylisocyanurate, and the like.

Examples of suitable high molecular weight (oligomeric) polyunsaturated compounds include, but are not limited to, acrylated epoxy resins, acrylated polyethers, acrylated polyurethanes, acrylated polyesters, and the like. Further examples of suitable unsaturated oligomers include unsaturated polyester resins that are normally prepared from maleic acid, phthalic acid and one or more diols and which have molecular weights of about 500 to about 3000. Such unsaturated oligomers may also be referred to as prepolymers. Single component systems based on photocurable prepolymers are often used as binders for printing inks. Unsaturated polyester resins are normally used in two-component systems together with a monounsaturated monomer such as described above, preferably with styrene.

The unsaturated compounds also can be used in admixture with non-photopolymerisable film-forming components. These components may typically be drying polymers or their solutions in organic solvents, such as nitrocellulose. They may also, however, be chemically curable or thermocurable resins such as, for example, polyisocyanates, polyepoxides, or melamine resins. The concomitant use of thermocurable resins may be desirable for use in so-called hybrid systems which are photopolymerised in a first step and crosslinked by a thermal after treatment in a second step.

The UV radiation curable inks also should contain at least one photoinitiator. A wide range of different photoinitiators is at present available for UV radiation curable systems. They include benzophenone and benzophenone derivatives, benzoin ethers, benzil ketals, dialkoxyacetophenones, hydroxyacetophenones, aminoacetophenones, haloacetophenones or acryloxyphosphine oxides. They differ in that they have different absorption maxima. To cover a wide absorption range it is possible to use a mixture of two or more photoinitiators. The total amount of photoinitiator in the UV radiation curable compositions may be in the range of, for example, from about 0.05 to about 10% by weight of the total composition. In one embodiment, the compositions contain from about 0.2% to about 5% by weight of the photoinitiator.

Amines may be added to accelerate the photopolymerization, for example triethanolamine, N-methyl-diethanolamine, p-dimethylaminobenzoate or Michler's ketone. The photopolymerization can further be accelerated by the addition of photosensitizers that displace or broaden the spectral sensitivity. Suitable photosensitizers include aromatic carbonyl compounds such as thioxanthone, anthraquinone and 3-acyl-coumarin derivatives as well as 3-(aroylmethylene)-thiazolines.

Hindered amine light stabilizers (HALS) that function as co-stabilizers may also be added to UV radiation curable printing compositions used in the present invention. Examples of hindered amine light stabilizers include those listed and recited in U.S. Pat. Nos. 5,112,890 and 4,636,408, which are incorporated herein by reference. A specific example of a hindered amine light stabilizer useful in the printing inks is Tinuvin 292, which is identified as bis(1,2,2,6,6-pentamethyl-4-piperidinyl)-sebacate.

In addition to the above described binder materials and photoinitiators, the UV radiation curable inks used in the present invention may also contain coloring matter selected from organic pigments, inorganic pigments, body pigments and dyes, which are known and have been used in this art. Examples of useful pigments include, but are not limited to, titanium dioxide, cadmium yellow, cadmium red, cadmium maroon, black iron oxide, carbon black, chrome green, gold, silver, aluminum and copper. Examples of dyes include, but are not limited to, alizarine red, Prussian blue, auramin naphthol, malachite green, etc. Generally the concentration of the pigment or dye in the ink may be from about 0 to about 70% by weight, and in one embodiment, from about 0.1% to about 50% by weight.

In addition to the above described coloring matter, UV radiation curable inks suitable for use as the non-adhesive material may also contain fillers, extenders, surfactants, and the like, which are known and have been used in this art. Examples of useful fillers and extenders include, for example, silicon dioxide, fumed silica, glass or ceramic microspheres, and glass or ceramic bubbles. Generally the concentration of the filler or extender may be from about 0 to about 70% by weight, and in one embodiment, from about 0.5% to about 50% by weight.

Inks suitable for use as the non-adhesive material may also contain at least one UV absorber, which provides weathering protection and helps prevent microcracking. The amount of UV absorber included in, for example, the UV radiation curable ink should be maintained at a practical minimum since the presence of the UV absorber may increase the curing rate. A variety of UV absorbers are known and useful in the non-adhesive material including UV absorbers belonging to the group of photopolymerizable hydroxybenzophenones and photopolymerizable benzotriazoles. U.S. Pat. No. 5,369,140 describes a class of 2-hydroxyphenyl-s-triazines that are useful as UV absorbers for radiation curable systems. The triazines are effective for stabilizing cured films when exposed to sunlight over a long period of time, and these stabilizers do not interfere with UV radiation curing of the inks. The triazine UV absorbers are effective in amounts of from about 0.1 to about 2% by weight. The UV absorbers may be used in combination with other light stabilizers such as sterically hindered amines. The disclosure of the '140 patent is hereby incorporated by reference for its disclosure of such UV absorber combinations. U.S. Pat. Nos. 5,559,163 and 5,162,390 also describe UV absorbers that are useful in the inks of the non-adhesive material.

Examples of useful UV-curable inks include those available from Decochem under the trade designation Poly-Rad plastics, as well as UV-curable inks commercially available from Acheson and Dow Chemical Company.

In one embodiment of the invention, the ink used to form the non-adhesive material on the adhesive layer may be a coalescing ink. The ink does not efficiently wet out on the surface of the adhesive, but coalesces into smaller areas of ink with an increase in ink dot height.

In one embodiment of the invention, the ink used to form the non-adhesive material comprises a porous non-adhesive. The porous non-adhesive may have elastomeric properties, so that if it is compressed, it essentially returns to its original shape. For example the porous non-adhesive comprises an ink containing a blowing agent that causes the ink to expand, forming an open or closed cell, or combination thereof. The blowing agent is activated, for example, by the application of heat to the ink. Other examples of porous non-adhesives include suspensions of gas and/or particles in a binder. The porous non-adhesive is then embedded into the adhesive layer. The porous non-adhesive fills the depression created in the embedding step, resulting in a facestock layer having a smooth outer appearance.

The non-adhesive forms may be provided in any shape as desired for a particular purpose or intended use. The shape of a non-adhesive form may be defined in terms of both the top-view shape and the cross-sectional shape of the forms. Suitable top-view shapes may include, but are not limited to, circles, ovals, rectangles, squares, pentagons, hexagons, irregular curve, regular curved, and the like. As shown in FIGS. 3-6, for example, the non-adhesive forms have a circular shape, and the non-adhesive forms of FIG. 7 have a rectangular shape (in a top plan view). The non-adhesive forms may also have any cross-sectional shape as desired, such as for example, a half ellipse (e.g., a hemisphere), a rectangle, a triangle, regular curve, irregular curve, and the like. In addition, as used herein, non-adhesive forms may also refer to a series or group of forms (e.g. 3-4, 4-5, etc.) which may repeat to form a lane.

In one embodiment, the non-adhesive forms may have a diameter up to about 300 μm. In one embodiment, the non-adhesive forms have a diameter of from about 10 to about 300 μm. In another embodiment, the non-adhesive forms have a diameter of from about 20 to about 120 μm.

In one embodiment, the non-adhesive forms comprise a printing ink and have a height from about 0.3 to about 40 microns, from about 0.5 to about 30 microns, or from about 2 to about 20 microns. The non-adhesive material may also be applied to the pressure sensitive adhesive by means of patterned vacuum metallization or sputtering. In this embodiment, the non-adhesive layer typically has a thickness from about 30 to about 3000, from about 100 to about 2000, or from about 300 to about 1500 nanometers.

The non-adhesive material may be applied to a surface by any suitable method. In one embodiment, for example, the non-adhesive material may be applied by printing, spraying, fountain coating, broadcast spreading and the like.

The total surface area covered by the pattern of non-adhesive forms may be selected as desired to provide suitable characteristics such as repositionability. In one embodiment, the non-adhesive forms cover from about 1% to about 35% of the total surface area of the adhesive surface (or the release surface of the release liner). In another embodiment, the non-adhesive forms cover from about 5% to about 10% of the total surface area of the adhesive surface (or the release surface of the release liner).

As described above, the adhesive article may comprise a facestock, an adhesive layer, a plurality of non-adhesive material and optionally the construction has a release liner. The facestock may be any of those which are useful for decorative or graphic image applications. The facestocks typically have a thickness from about 10 to about 300 microns, or from about 25 to about 125 microns. The facestocks include paper, polyolefins (linear or branched), polyamides, polystyrenes, polyesters, polyester copolymers, polyurethanes, polysulfones, polyvinylchloride, styrene-maleic anhydride copolymers, styrene-acrylonitrile copolymers, ionomers based on sodium or zinc salts of ethylene methacrylic acid, polymethyl methacrylates, cellulosics, fluoroplastics, acrylic polymers and copolymers, polycarbonates, polyacrylonitriles, and ethylene-vinyl acetate copolymers. Included in this group are acrylates such as ethylene methacrylic acid, ethylene methyl acrylate, ethylene acrylic acid and ethylene ethyl acrylate. Also, included in this group are polymers and copolymers of olefin monomers having, for example, 2 to about 12 carbon atoms, and in one embodiment 2 to about 8 carbon atoms. These include the polymers of alpha-olefins having from 2 to about 4 carbon atoms per molecule. These include polyethylene, polypropylene, poly-1-butene, etc. An example of a copolymer within the above definition is a copolymer of ethylene with 1-butene having from about 1 to about 10 weight percent of the 1-butene comonomer incorporated into the copolymer molecule. The polyethylenes that are useful have various densities including low, medium and high density ranges. The low density range is from about 0.910 to about 0.925 g/cm$^3$; the medium density range is from about 0.925 to about 0.940 g/cm$^3$; and the high density range is from about 0.94 to about 0.965 g/cm$^3$. Films prepared from blends of copolymers or blends of copolymers with homopolymers also are useful. The films may be extruded as a monolayer film or a multi-layered film.

In one embodiment, the first facestock is a polymeric facestock, which contains migratory additives. A particular suitable facestock comprises polyvinylchloride facestocks. The additives may include plasticizers and antioxidants. The plasticizer is a high-boiling solvent or softening agent, usually liquid. It is an ester made from an anhydride or acid and a suitable alcohol that usually has between 6 to 13 carbon atoms. The plasticizers may be adipate, phosphate, benzoate or phthalate esters, polyalkylene oxides, sulfonamides, etc. The plasticizers include but are not limited to DOA plasticizer (dioctyl adipate), TEG-EH plasticizer (triethylene glycol di-2-ethylhexanoate), TOTM plasticizer (trioctyl trimellitate), triacetin plasticizer (glyceryl triacetate), TXIB plasticizer (2,2,4-trimethyl-1,3-pentanediol diisobutyrate), DEP plasticizer (diethyl phthalate), DOTP plasticizer (dioctyl terephthalate), DMP plasticizer (dimethyl phthalate), DOP plasticizer (dioctyl phthalate), DBP plasticizer (dibutyl phthalate), hydrogenated phthalats, DIDP (di-isodecyl phthalate), DINP (di-isononyl phthalate), polyethylene oxide, toluenesulfonamide, dipropylene glycol benzoate, and the like.

The facestock may be configured or shaped as desired for a particular purpose or intended use. The facestock may be a single layer or may comprise multiple layers. Multiple layers may be employed to provide protection, weatherability, printability or other characteristics to the adhesive article. Indicia or graphics, such as information, logos, designs, phrases, pictures, or the like may be applied to the substrate or facestock. In one embodiment, indicia may be applied by printing a surface of the substrate or facestock.

The adhesive layer may be formed from any suitable adhesive material as desired for a particular purpose or intended use. In one embodiment, the adhesive layer comprises a pressure sensitive adhesive layer. In some applications, the adhesive may be a heat activated adhesive, as distinguished from a pressure sensitive adhesive. The pressure-sensitive adhesive can be any pressure sensitive adhesive now known in the art or later discovered. These include rubber based adhesives, acrylic adhesives, vinyl ether adhesives, silicone adhesives, and mixtures of two or more thereof. Included are the pressure sensitive adhesive materials described in "Adhesion and Bonding", *Encyclopedia of Polymer Science and Engineering*, Vol. 1, pages 476-546, Interscience Publishers, 2nd Ed. 1985, the disclosure of which is hereby incorporated by reference. The pressure sensitive adhesive materials that are useful may contain as a major constituent an adhesive polymer such as acrylic type polymers, block copolymers, natural, reclaimed or styrene butadiene rubbers, tackified natural or synthetic rubbers, random copolymers of ethylene and vinyl acetate, ethylene-vinyl-acrylic terpolymers, polyisobutylene, poly(vinyl ether), etc. In one embodiment, the pressure sensitive adhesive materials may be characterized by glass transition temperatures in the range of about $-70°$ C. to about $10°$ C.

Other materials in addition to the foregoing resins may be included in the pressure sensitive adhesive materials. These include solid tackifying resins, liquid tackifiers (often referred to as plasticizers), antioxidants, fillers, pigments, waxes, etc. The adhesive materials may contain a blend of solid tackifying resins and liquid tackifying resins (or liquid plasticizers). Particularly useful adhesives are described in U.S. Pat. Nos. 5,192,612 and 5,346,766, which are incorporated herein by reference.

The adhesive layer may have a thickness as desired for a particular purpose or intended use. In one embodiment, the adhesive layer may have a thickness from about 10 to about 125, or from about 10 to about 75, or from about 10 to about 50 microns. In one embodiment, the coat weight of the pressure sensitive adhesive may be in the range of about 10 to about 50 grams per square meter (gsm), and in one embodiment about 20 to about 35 gsm.

The construction of the adhesive layer is not limited and may be any suitable construction or configuration as desired for a particular purpose or intended use. For example, in one embodiment, the adhesive layer may be a single layer construction. In another embodiment, the adhesive layer may be a multi-layer construction comprising two or more adhesive layers. In one embodiment, the adhesive layer(s) may also be substantially continuous. In another embodiment, the adhesive layer(s) may be provided as a discontinuous layer, coated pattern or multiple layers.

The pressure sensitive adhesive can be applied using standard coating techniques, such as curtain coating, gravure coating, reverse gravure coating, offset gravure coating, roller coating, brushing, knife-over roll coating, air knife coating metering rod coating, reverse roll coating, doctor knife coating, dipping, die coating, spraying, and the like. The application of these coating techniques is well known in the industry and can effectively be implemented by one skilled in the art. The knowledge and expertise of the manufacturing facility applying the coating determine the preferred method. Further information on coating methods can be found in "Modern Coating and Drying Technology", by Edward Cohen and Edgar Gutoff, VCH Publishers, Inc., 1992.

Release liners for use in the present invention may be those known in the art. In general, useful release liners include polyethylene coated papers with a commercial silicone release coating, polyethylene coated polyethylene terephthalate films with a commercial silicone release coating, or cast polypropylene films that can be embossed with a pattern or patterns while making such films, and thereafter coated with a commercial silicone release coating. A particularly suitable release liner is kraft paper which has a coating of low density polyethylene on the front side with a silicone release coating and a coating of high density polyethylene on the back side. Other release liners known in the art are also suitable as long as they are selected for their release characteristics relative to the pressure sensitive adhesive chosen for use in the present invention. In one embodiment of the invention, the release liner has a moldable layer of polymer under the release coating. The moldable layer may be, for example, a polyolefin such as, but not limited to, polyethylene or polypropylene. The surface of the release layer of the release liner may have a textured finish, a smooth finish, or a patterned finish. The release layer may have a randomly microstructured surface such as a matte finish, or have a pattern of three-dimensional microstructures. The microstructures may have a cross-section which is made up of circles, ovals, diamonds, squares, rectangles, triangles, polygons, lines or irregular shapes, when the cross-section is taken parallel to the surface of the release surface.

In one embodiment, the release liner has a release coating on both sides; one side having a release coating of a higher release value than the release coating of the other side.

The adhesive article may be prepared by applying a non-adhesive material to the release coating of a release liner. The non-adhesive material may be fully or partially embedded into the release liner. In one embodiment, embedding may be carried out using pressure and/or heated rollers or a platen, whereby the non-adhesive material is pressed into the release liner. As previously described, the release liner may have a moldable layer of polymer under the release coating, which softens upon the application of heat, allowing the non-adhesive material to be embedded into the liner.

Embedding temperatures depend on the materials used, but typically are in the range of about $150°$ to about $300°$ F., or from about $200°$ to about $250°$ F. for embedding into the release liner. The embedding pressure is also material dependent and is typically between about 25 to about 400 pounds per square inch (psi), or from about 100 to about 250 psi.

Figure 8A:
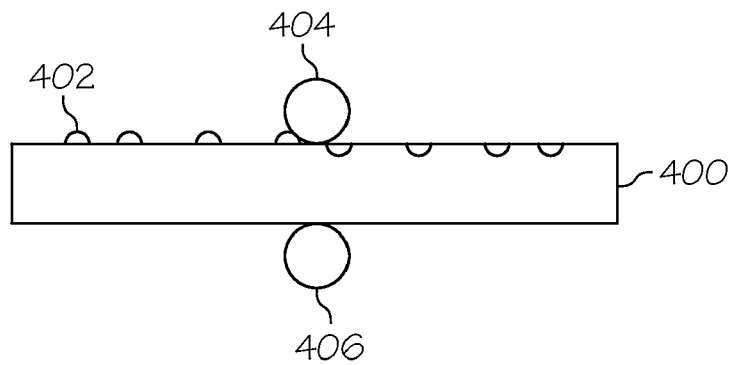
FIG. 8 is a schematic illustration of a process for applying and embedding the non-adhesive material.
Figure 8B:
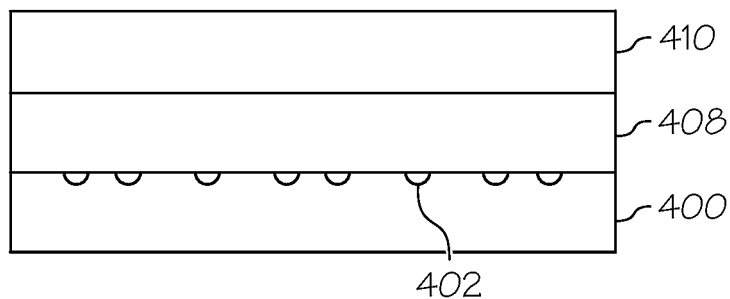
Figure 8C:
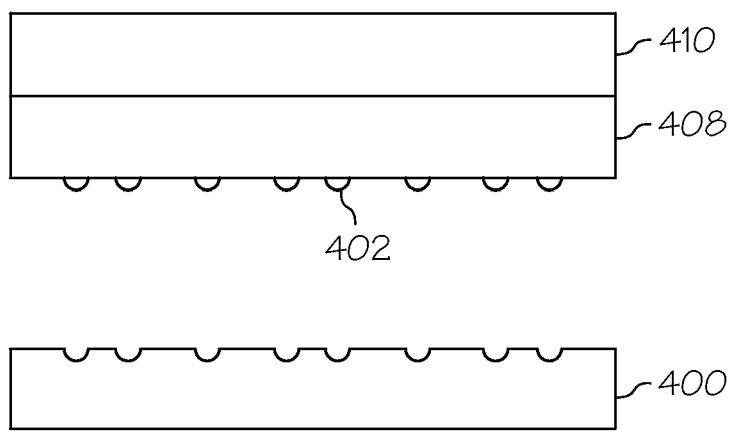

Referring to FIGS. 8a-8c, a method of forming an adhesive article is illustrated. Referring to FIG. 8a, a release liner 400 is printed on the release surface with non-adhesive material 402 in a pattern. The release liner is passed through laminating rollers 404 and 406. Generally, the release liner and one of the laminating rollers are heated, and the other laminating roller is cooled. The materials selected determine the heating and cooling configurations that may be used. The laminating rollers may be steel rollers, rubber rollers or a combination. In one embodiment, a texture is applied when embedding the non-adhesive material. In this embodiment, the roller has a textured surface, such as matte finish. The roller may also have a patterned surface. A silicone rubber roller is an example of a roller which may be used to impart a texture or pattern. In FIG. 8b, after embedding the non-adhesive material 402, the release liner 400 is coated with adhesive 408 and following drying, cooling, and/or curing the adhesive, a facestock 410 is added to the construction. In FIG. 8c, the facestock 410 and the adhesive layer 408 are separated from the release liner 406. Because of the release characteristics of the release liner, the adhesive bond between the non-adhesive material 402 to the adhesive layer 408 is greater than the bond between the non-adhesive material 402 and the release liner 400. Thus, when the release liner 400 is removed from the adhesive layer 408, the non-adhesive material 402 is adhered to the adhesive layer 408 and is removed with the adhesive layer 408.

In another embodiment, an adhesive article having improved air egress, repositionability, and slideability characteristics is provided by simultaneously printing and embedding a pattern of non-adhesive forms into the surface of a liner which contains a moldable layer under the silicone release. A pattern is printed on the release surface of a poly-coated release liner using a non-adhesive that has a greater adhesion to the subsequently applied adhesive than the release liner. The pattern may be applied to the release surface by hot melt flexographic techniques. As the pattern is printed, the combination of heat and pressure provided by the raised portion of the flexographic printing roll and the heat from the printing ink cause the moldable layer under the silicone release layer to be depressed and the ink on the liner to be embedded. Other techniques that are applicable are hot stamping and using conventional flexographic printing in combination with a heated backing roll. The liner is then coated with adhesive and transferred to a facestock, such as cast or extruded vinyl. The release liner is then removed to expose the raised non-adhesive pattern of non-adhesive material on the surface of the adhesive.

Embedding the non-adhesive forms comprises at least partially embedding in the release liner. In one embodiment, the non-adhesive forms are embedded such that the upper surface of the non-adhesive forms is substantially even with the plane of the surface of the release liner (see, e.g., FIGS. 1-2, 8a, and 8b). In another embodiment, the non-adhesive are embedded such that the upper surface of the non-adhesive forms extends at least partially above the plane of the surface of the release liner. In another embodiment, the non-adhesive forms may be embedded such that the upper surface of the non-adhesive forms lies below the surface of the release liner.

Another embodiment of the method of making the adhesive articles of the present invention includes the steps of: (a) applying a pattern of a non-adhesive material onto a release liner; (b) embedding the non-adhesive material into the release liner; (c) coating a pressure sensitive adhesive onto the release layer of the release liner; and (d) applying an additional release liner with a higher or lower release to the adhesive layer. The additional release liner may be omitted if the initial release liner has a release means on both surfaces. In this case, a pattern of a non-adhesive material may be applied to and embedded into one or both release surfaces of the initial release liner. These embodiments are commonly known as transfer adhesives or adhesive sandwiches.

Another embodiment of the method of making the adhesive articles of the present invention includes the steps of: (a) applying a pattern of a non-adhesive material onto one or both sides of a release liner that has a release coating on both sides with the release of one side being higher than the other; (b) embedding the non-adhesive material into one or both sides of the release liner; (c) coating a pressure sensitive adhesive onto both sides of the release liner; and (d) applying a facestock having a front and back surface to the first adhesive layer, with the front surface of the facestock adhered to the outer surface of the first adhesive layer, and winding the material so that the outer surface of the second adhesive layer is in adhesive contact with the back surface of the facestock. The embedding and applying steps may be combined. This embodiment is commonly known as a double faced or sided adhesive structure such as a tape or film. It will be appreciated that an adhesive article may also be formed by depositing the non-adhesive material directly onto an adhesive surface.

In another embodiment, a non-adhesive article may be formed by (a) embossing a pattern of depressions into a release liner, (b) filling the depressions with non-adhesive material, (c) coating a pressure sensitive material over the surface of the release liner having the filled depressions, and (d) applying a face stock or a second release liner over the pressure sensitive adhesive. The depressions may be formed by any suitable embossing method. The depressions may be sized and shaped to provide non-adhesive forms of a desired height and a desired geometric configuration.

An adhesive article having a pattern of non-adhesive forms in accordance with aspects of the invention may be applied to a substrate by removing the release liner from the article, draping the article over a surface of the substrate such that the side of the adhesive surface comprising the non-adhesive forms contacts a surface of the substrate, and applying pressure to the adhesive article such that the adhesive surface adheres to the substrate. Pressure may be applied in any suitable manner such as by hand, squeegee, and the like. Applicants have found that a pattern of non-adhesive forms comprising a combination of (i) lanes comprising closely spaced non-adhesive forms, and (ii) a pattern of more largely spaced non-adhesive forms disposed in a region adjacent to the lanes provides an article with both repositionability characteristics and air egress. These features are provided without the need for embossed passages disposed in the adhesive surface. The pattern of non-adhesive forms disposed in the area adjacent the lanes prevent pre-sticking of the draped film by reducing the initial tenacity of the adhesive if no pressure is applied to the draped article. This allows easy positioning and, if necessary, repositioning of the article. Upon application of moderate pressure, the adhesive will begin to adhere to the substrate in the areas with the larger spaced non-adhesive forms (e.g., the areas adjacent the lanes). Air entrapped in these areas may flow to areas with the more closely spaced non-adhesive forms (the lanes), where there is still substantially no contact between the adhesive and the substrate. Thus, upon moderate application of pressure, the lanes provide the feature of air egress. Upon application of greater pressure, the sheet will begin to adhere in the areas comprising the lanes. Minor traces of air entrapped between or within the lanes will disappear over time such as, for example, by dissolution in the adhesive and diffusion through the adhesive and facestock.

While the disclosed technology has been described in relation to various exemplary embodiments, it is to be understood that various modifications thereof may become apparent to those skilled in the art upon reading the specification. Therefore, it is to be understood that the technology disclosed herein is intended to cover such modifications as fall within the scope of the appended claims.

What is claimed is:

1. A release liner comprising:
   a moldable layer;
   a release layer overlying the moldable layer, the release layer having a top surface; and
   a pattern of discrete, non-adhesive forms at least partially embedded into the release layer, the pattern of non-adhesive forms comprising:

a lane comprising a first row of discrete non-adhesive forms and a second row of discrete non-adhesive forms adjacent the first row of non-adhesive forms, the first and second rows being spaced apart from each other by a spacing $S_1$ and individually having a maximum form-to-form spacing $S_3$ between adjacent non-adhesive forms within a given row, at least some adjacent forms within one of the first and second rows are connected to one another; and a pattern of non-adhesive forms disposed in an area adjacent the lane and comprising at least two non-adhesive forms having a second form-to-form spacing $S_2$, wherein $S_2$ is greater than $S_1$ and/or $S_3$; and wherein the non-adhesive forms cover from about 1% to about 35% of the top surface of the release layer.

2. The release liner of claim 1 comprising at least two lanes spaced apart from one another, wherein the pattern of non-adhesive forms disposed adjacent the lane is disposed in an area intermediate the at least two lanes.

3. The release liner of claim 1 comprising two or more lanes disposed substantially parallel to one another.

4. The release liner of claim 1 comprising a plurality of lanes interconnected in a manner so as to define the edges of a polygon or define a curved geometry.

5. The release liner of claim 4, wherein the lanes are interconnected to form an array of polygons.

6. The release liner of claim 4, wherein the polygons are chosen from a triangle, a rectangle, a diamond, a pentagon, a hexagon, a heptagon, an octagon, a trapezoid, or a combination of two or more thereof.

7. The release liner of claim 1, wherein the form-to-form spacing $S_1$ is from about 1 to about 150 μm.

8. The release liner of claim 1, wherein the form-to-form spacing $S_1$ is from about 50 to about 150 μm.

9. The release liner of claim 1, wherein the form-to-form spacing $S_2$ is from about 5 to about 500 μm.

10. The release liner of claim 1, wherein the form-to-form spacing $S_2$ is from about 50 to about 300 μm.

11. The release liner of claim 1, wherein $S_2$ is greater than $S_1$.

12. The release liner of claim 1, wherein $S_2$ is greater than $S_3$.

13. The release liner of claim 1, wherein $S_2$ is greater than $S_1$ and $S_3$.

14. The release liner of claim 1, wherein $S_3$ is from about 1 to about 150 μm.

15. The release liner of claim 1, wherein the non-adhesive forms cover from about 3% to about 20% of the total surface area of the top surface of the release layer.

* * * * *